J. A. CARSWELL.
BICYCLE COUPLING.
APPLICATION FILED JAN. 16, 1918.
1,300,343.
Patented Apr. 15, 1919.
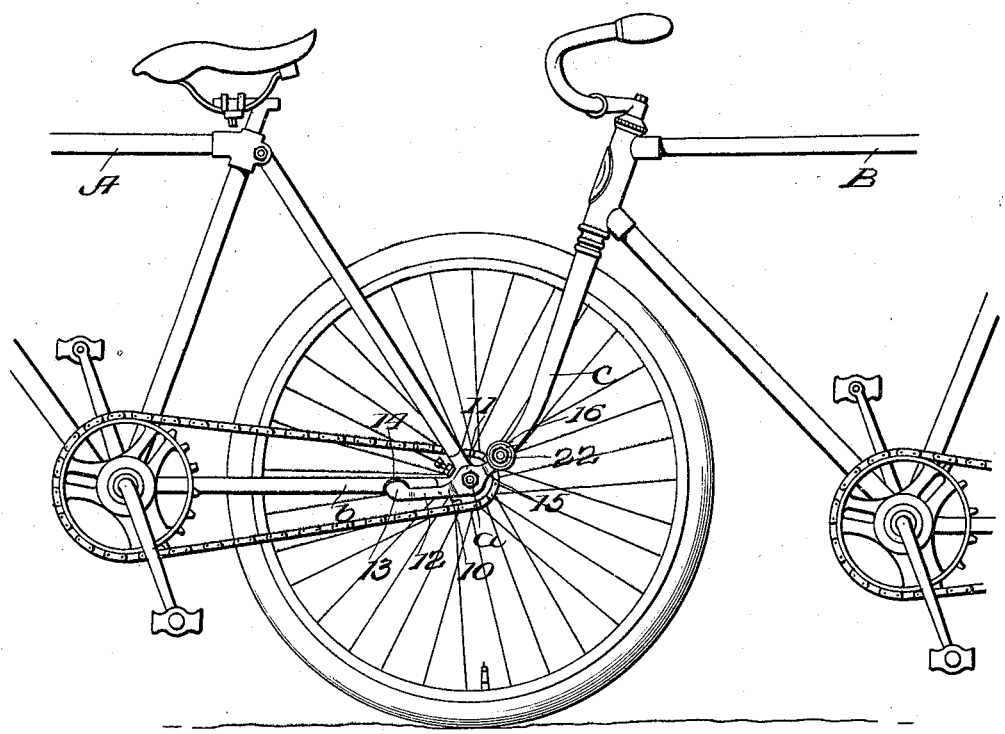
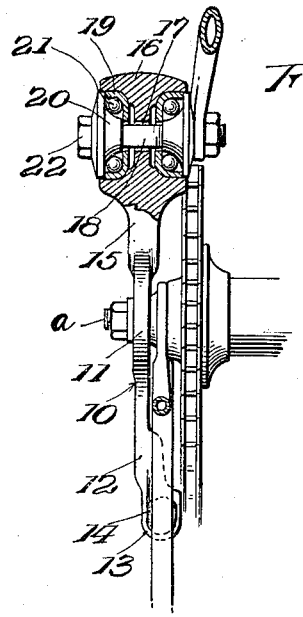
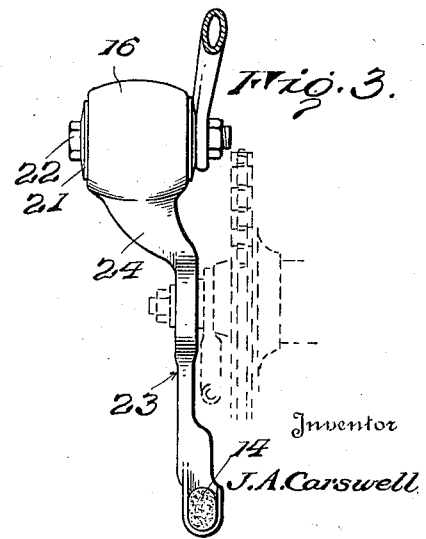
Inventor
J. A. Carswell
By
H. A. B. Stacey, Attorneys.

UNITED STATES PATENT OFFICE.

JAMES A. CARSWELL, OF AUGUSTA, GEORGIA.

BICYCLE-COUPLING.

1,300,343.  Specification of Letters Patent.  Patented Apr. 15, 1919.

Application filed January 16, 1918. Serial No. 212,114.

*To all whom it may concern:*

Be it known that I, JAMES A. CARSWELL, a citizen of the United States, residing at Augusta, in the county of Richmond and State of Georgia, have invented certain new and useful Improvements in Bicycle-Couplings, of which the following is a specification.

My invention relates to new and useful improvements in bicycle attachments, and more particularly in devices for coupling bicycles one behind the other, the primary object of my invention being the provision of suitable coupling links by means of which two or more bicycles may be connected together one behind the other with the rear wheel of the leading bicycle serving as the forward wheel of the following bicycle.

In this connection one of the objects of my invention resides in so constructing the coupling links that no modifications in the bicycle constructions will be necessary, in such a manner that the bicycles may be quickly coupled together and in such a manner that whenever desired the bicycles may be separated and used independently.

Another object which I have in view is to construct the couplings in such a manner that the strain exerted upon the rear portion of the frame of one of the bicycles due to the necessity of supporting a part of the weight of the other bicycle and rider as well as its own weight and the weight of its rider will be divided between the spindle of the rear wheel and the frame of such bicycle so that all breakage is avoided.

With these and other objects in view, my invention will be more fully described, illustrated in the accompanying drawings and then specifically pointed out in the claims which form a part of this application.

In the drawings:

Figure 1 is a fragmentary side elevation showing two bicycles connected by my improved coupling links;

Fig. 2 is a fragmentary plan view, partially in section showing one of the coupling links and the correlated portions of the bicycles;

Fig. 3 is a view corresponding to Fig. 2 illustrating a slightly modified form of link.

Corresponding and like parts are referred to in the following description and indicated in all the views of the drawings by the same reference characters.

My improved attachment, as best shown in Fig. 2 of the drawings, in connection with Fig 1, includes a pair of coupling links 10 which except that they are made in lefts and rights are of identical construction. Each coupling link includes a hub plate 11 adapted to be mounted upon one end of the rear spindle of the bicycle and provided with an arm 12 having a laterally offset terminal 13 the upper face of which is concave transversely and provided with a pad 14 of rubber, felt or other suitable material. The terminal 13 of one coupling will be offset in one direction while the terminal 13 of the other coupling will be offset in the other direction.

Also extending from the hub plate 11 is a second arm 15 disposed at a slight inclination to the first arm and terminating in a hub 16 having a diametric bore 17 to receive a spindle 18. The ends of the hub are recessed to receive bearing cups 19 and the spindle carries cone bearings 20 so that series of ball bearings 21 may be interposed between the cone bearings and bearing cups. Nuts 22 threaded upon the ends of the spindle serve to retain the parts in place.

The above described structure constitutes my present invention but in order to insure a clear understanding of its application and use I have illustrated it in connection with two bicycles A and B, the latter being coupled behind the former. A rear spindle *a* supports the rear wheel of the forward bicycle, and the hub plates 11 of a pair of my couplings are mounted upon the ends of this spindle by removing the nuts from the spindle and are then secured thereon by replacing the nuts. These coupling links are so mounted upon these spindles *a* that the lateral extensions 13 engage beneath the horizontal arms of the rear fork *b* of the bicycle A, while their arms 15, which are somewhat shorter project rearwardly and upwardly. The forward wheel and its spindle of the bicycle B are removed and the inner nuts 22 of the spindles 18 are removed so that the ends of the arms of the forward fork *c* of the bicycle B may be applied to the inner ends of the spindles 18 to lie between the hub 16 and the rear wheel of the bicycle A. These nuts are again applied to secure the parts in place.

Under these circumstances it will be apparent that the two bicycles are coupled one directly behind the other with the rear wheel of the front bicycle serving as the forward wheel of the rear bicycle. It will further be apparent that the coupling provides for all necessary independent movement of the bicycles such as is occasioned through variations in grade as in going over ridges or through narrow valleys. At the same time the bicycles may be readily uncoupled at will and the forward wheel of the rear bicycle replaced when both bicycles may be employed in the usual manner.

It will, of course, be appreciated that by the use of a number of pairs of coupling links any desired number of bicycles may be coupled one behind the other. Furthermore, if desired a motorcycle may be coupled behind one or more bicycles and its motor employed to drive the entire series of bicycles. If such is the case I preferably provide a somewhat modified form of coupling link such as that shown at 23 in Fig. 3. The sole difference in this link consists in the fact that its arm 24, corresponding to the arm 15 is outwardly offset so that the inner faces of the hubs of two couplings of this character will be spaced farther apart in order that they may better receive between them the arms of the forward fork of a motorcycle as the forward forks of motorcycles are usually wider than those of bicycles. However, the form of coupling link shown in Fig. 2 may be employed if the spindle is made of sufficient length by inserting washers between the inner cone bearings and the outer faces of the arms of the forward fork of the motorcycle.

Having thus described the invention, what is claimed as new is:

1. The combination with a bicycle having a rear wheel and spindle and a bicycle having a forward wheel receiving fork, of means for coupling the fork of the second bicycle to the spindle of the first bicycle, said means including coupling links applicable to the spindle of the first bicycle, and having arms adapted to receive and support the ends of the fork of the second bicycle, the arms being formed to provide hubs, spindles journaled at their end portions in such hubs, and means carried by the spindles for securing the ends of the fork thereon.

2. The combination with a bicycle having a rear frame portion supporting a spindle carrying a rear wheel and a second bicycle having a forward fork, of coupling links mounted upon the spindle at its ends, arms projecting from the coupling links and engaging beneath certain portions of the frame to limit turning movement of the links in one direction, and arms extending upwardly from the links at an angle to the first arms and free at their ends to receive the free ends of the fork of the second bicycle.

3. The combination with a bicycle having a rear frame portion supporting a spindle carrying a rear wheel and a second bicycle having a forward fork, of coupling links mounted upon the spindle at its ends, arms projecting from the coupling links and engaging beneath certain portions of the frame to limit turning movement of the links in one direction, and arms extending from the links at an angle to the first arms and adapted at their ends to receive the free ends of the fork of the second bicycle, said latter arms at their free ends being thickened to provide hubs, spindles journaled in the hubs to receive the ends of the fork, and bearings in the hubs for the spindles.

4. A coupling attachment for bicycles including a pair of coupling links having hub plates adapted for application to the rear spindle of a bicycle to rotate upon the said spindle, arms extending forwardly from the said plates and free to engage beneath a bicycle frame, and additional arms extending rearwardly and upwardly from the hub plates and free at their outer ends to pivotally receive the forward ends of the fork of a second bicycle whereby the said fork ends will be supported above the pivotal centers of the said links.

5. A coupling attachment for bicycles including a pair of coupling links including hub plates adapted to swingingly support the links, arms extending forwardly from the plates and having inwardly directed stop terminals, arms extending rearwardly from the plates and thickened at their outer ends to form hubs, anti-friction bearings seated in opposite side faces of said hubs, and spindles extending loosely through the hubs and journaled at their outer end portions upon said bearings, the said spindles being adapted to support the forward fork of a bicycle.

In testimony whereof I affix my signature.

JAMES A. CARSWELL. [L. S.]

Copies of this patent may be obtained for five cents each, by addressing the "Commissioner of Patents, Washington, D. C."